(12) United States Patent
Kuranuki

(10) Patent No.: US 12,459,366 B2
(45) Date of Patent: Nov. 4, 2025

(54) FAILURE PREDICTION SYSTEM, FAILURE PREDICTION METHOD, AND FAILURE PREDICTION PROGRAM

(71) Applicant: Panasonic Intellectual Property Management Co., Ltd., Osaka (JP)

(72) Inventor: Masaaki Kuranuki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 18/579,933

(22) PCT Filed: Jun. 30, 2022

(86) PCT No.: PCT/JP2022/026185
§ 371 (c)(1),
(2) Date: Jan. 17, 2024

(87) PCT Pub. No.: WO2023/008082
PCT Pub. Date: Feb. 2, 2023

(65) Prior Publication Data
US 2024/0351442 A1    Oct. 24, 2024

(30) Foreign Application Priority Data

Jul. 26, 2021    (JP) .................... 2021-121662

(51) Int. Cl.
*B60L 3/00* (2019.01)
*B60L 3/12* (2006.01)
(52) U.S. Cl.
CPC .............. *B60L 3/0061* (2013.01); *B60L 3/12* (2013.01); *B60L 2240/421* (2013.01);
(Continued)

(58) Field of Classification Search
CPC .... B60L 3/0061; B60L 3/12; B60L 2240/421; B60L 2240/423; B60L 2240/427;
(Continued)

(56) References Cited

U.S. PATENT DOCUMENTS

2013/0317686 A1    11/2013   Schleser et al.
2020/0274437 A1*   8/2020    Deguchi ................ H02M 1/32

FOREIGN PATENT DOCUMENTS

JP    2019-037024    3/2019

OTHER PUBLICATIONS

The EPC Office Action dated Oct. 24, 2024 for the related European Patent Application No. 22849150.2.
(Continued)

*Primary Examiner* — Rodney A Butler
(74) *Attorney, Agent, or Firm* — Rimon P.C.

(57) ABSTRACT

An acquirer acquires driving data of an electrically-powered moving body. A predictor predicts, based on the driving data of the electrically-powered moving body, an aging failure of an electromechanical transducer including a motor driving a driving wheel of the electrically-powered moving body and a drive circuit driving the motor. The driving data include an input voltage of the drive circuit, an input current of the drive circuit, a rotational speed of the motor driven by the drive circuit, and a rotational torque of the motor. The predictor predicts the aging failure of the electromechanical transducer based on a change of a value statistically representing a relationship between an input electric power of the drive circuit, obtained based on the input voltage and the input current of the drive circuit, and a shaft output power of the motor, obtained based on the rotational speed and the rotational torque of the motor.

8 Claims, 7 Drawing Sheets

(52) U.S. Cl.
CPC ... *B60L 2240/423* (2013.01); *B60L 2240/427* (2013.01); *B60L 2240/429* (2013.01)

(58) Field of Classification Search
CPC .......... B60L 2240/429; B60L 2240/12; B60L 3/003; B60L 2240/527; B60L 2240/529; B60L 2260/44; B60L 2260/50; H02M 7/5387; G16Y 10/40; G16Y 20/20; G16Y 40/20; Y02T 10/72
See application file for complete search history.

(56) References Cited

OTHER PUBLICATIONS

International Search Report of PCT application No. PCT/JP2022/026185 dated Sep. 13, 2022.

\* cited by examiner

Vehicle speed-input electric power

Vehicle speed-shaft output power

FAILURE PREDICTION SYSTEM, FAILURE PREDICTION METHOD, AND FAILURE PREDICTION PROGRAM

CROSS-REFERENCE TO RELATED APPLICATIONS

This application is a U.S. national stage application of the PCT International Application No. PCT/JP2022/026185 filed on Jun. 30, 2022, which claims the benefit of foreign priority of Japanese patent application No. 2021-121662 filed on Jul. 26, 2021, the contents all of which are incorporated herein by reference.

BACKGROUND

Technical Field

The present disclosure relates to a failure prediction system, a failure prediction method, and a failure prediction program, for predicting an aging failure of an inverter and a motor that are mounted in an electrically-powered moving body.

Background Art

Electric vehicles (EVs) are becoming increasingly popular, particularly in business use vehicles, such as delivery vehicles. In recent years, an environment has been emerging in which driving data of EVs, such as battery information and vehicle control information, have been stored in the cloud so as to be utilized in many various ways.

Key devices of EVs are motors, inverters, and battery packs. The power devices used for the inverters, such as MOSFETs (Metal-Oxide Semiconductor Field-Effect Transmitters) and IGBTs (Insulated Gate Bipolar Transistors), undergo deterioration over time. A major cause of the deterioration of the power devices is an increase in contact resistance of bonding wires. This is due to metal fatigue resulting from heat cycling, and the increase in contact resistance of bonding wires appears as an increase in loss (a decrease in efficiency) of the power devices. PTL 1 discloses a technique of predicting the lifetime of IGBT of an inverter from the difference between the input power and the output power of the inverter.

CITATION LIST

Patent Literature

PTL 1: Japanese Patent Unexamined Publication No. 2019-037024

SUMMARY

PTL 1 relates to an inverter for driving a motor of a crane. However, in the case of an inverter for driving a motor that rotates at high speed, such as that for EVs, the voltage and current of three-phase sine wave alternating current between the inverter and the motor change at high speed. In this case, in the technique of calculating the input power and the output power of the inverter, it is necessary to sample the input voltage, input current, output voltage, and output current of the inverter at high speed in order to ensure the corresponding relationship between the input power and the output power of the inverter. Storing such log data necessitates a large capacity memory that enables high speed access. Use of such a high-specification memory increases cost.

In order to predict deterioration over time of devices other than the power devices, such as electrolytic capacitors, coils, and fans, respective dedicated sensors are necessary. Accordingly, in order to predict deterioration over time of such devices mounted in EVs, design modifications for adding dedicated sensors are necessary. On the other hand, deterioration over time of power devices can be predicted without adding dedicated sensors if the loss can be predicted.

The present disclosure has been made in view of the foregoing and other circumstances, and it is an object of the disclosure to provide a technique of predicting deterioration over time of an electromechanical transducer of an electrically-powered moving body at low cost.

In order to solve the foregoing and other problems, a failure prediction system according to an aspect of the present disclosure includes an acquirer acquiring driving data of an electrically-powered moving body, and a predictor predicting, based on the driving data of the electrically-powered moving body, an aging failure of an electromechanical transducer including a motor driving a driving wheel of the electrically-powered moving body and a drive circuit driving the motor. The driving data include an input voltage of the drive circuit, an input current of the drive circuit, a rotational speed of the motor driven by the drive circuit, and a rotational torque of the motor, and the predictor predicts the aging failure of the electromechanical transducer based on a change of a value statistically representing a relationship between an input electric power of the drive circuit and a shaft output power of the motor, the input electric power of the drive circuit obtained based on the input voltage and the input current of the drive circuit, and the shaft output power of the motor obtained based on the rotational speed and the rotational torque of the motor.

Any combinations of the above-described constituent elements, and any changes of expressions in the present disclosure made among devices, systems, methods, computer programs, recording media storing computer programs, etc., are also effective embodiments of the present disclosure.

According to the present disclosure, it is possible to predict deterioration over time of the electromechanical transducer of the electrically-powered moving body at low cost.

DESCRIPTION OF EMBODIMENTS

Figure 1:
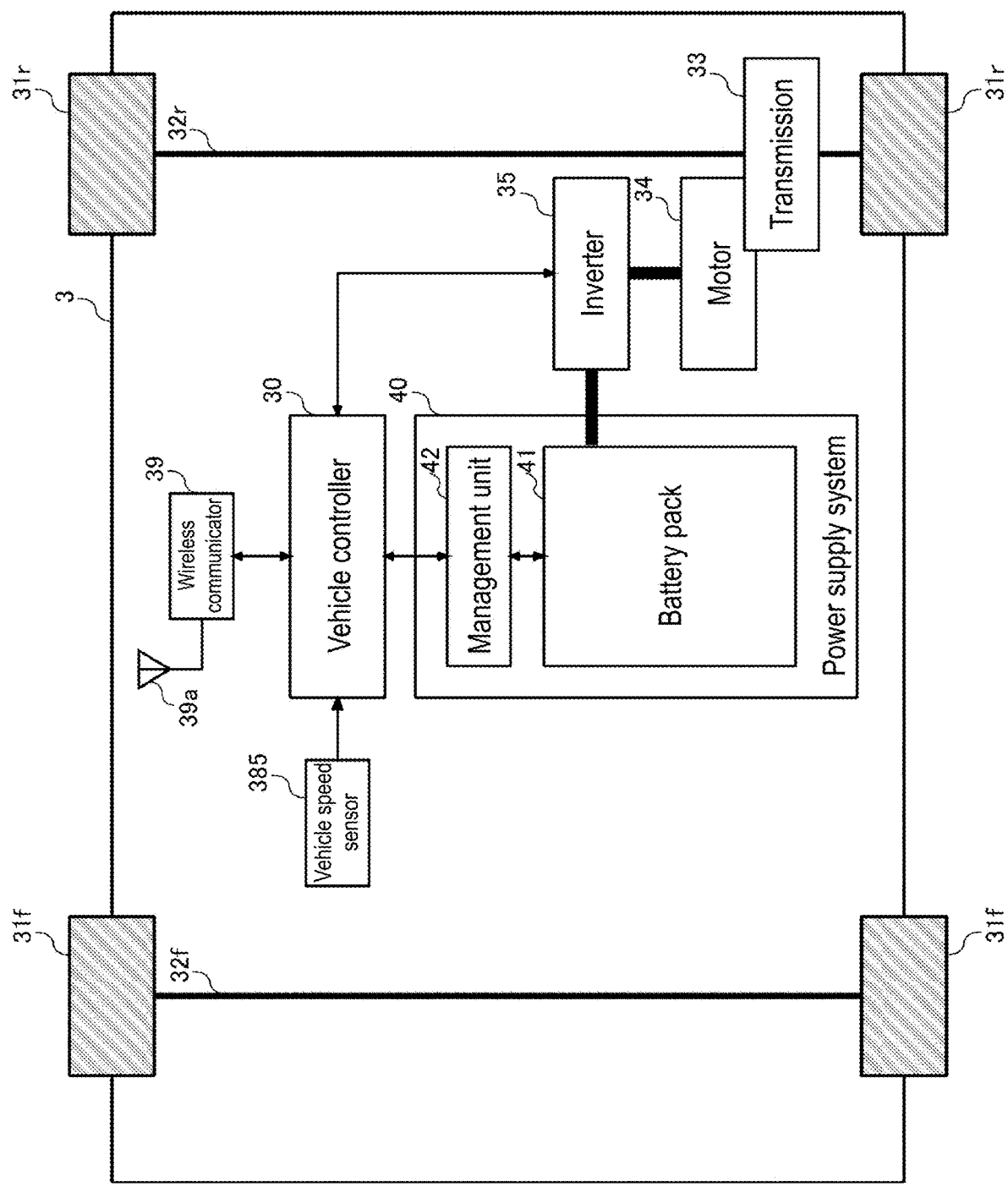
FIG. 1 is a view illustrating the schematic configuration of an electrically-powered vehicle according to an exemplary embodiment.

FIG. 1 is a view illustrating the schematic configuration of electrically-powered vehicle 3 according to an exemplary embodiment. The present exemplary embodiment assumes a pure EV without an internal combustion engine as electrically-powered vehicle 3. Electrically-powered vehicle 3 shown in FIG. 1 is a rear-wheel drive (2WD) EV, which includes a pair of front wheels 31$f$, a pair of rear wheels 31$r$, and motor 34 as a motive power source. The pair of front wheels 31$f$ are connected by front wheel axle 32$f$, and the pair of rear wheels 31$r$ are connected by rear wheel axle 32$r$. Transmission 33 transmits rotation of motor 34 to rear wheel axle 32$r$ with a predetermined transmission ratio. Note that electrically-powered vehicle 3 may be front-wheel drive (2WD) or 4WD.

Power supply system 40 includes battery pack 41 and management unit 42. Battery pack 41 includes a plurality of cells. For the cells, it is possible to use lithium-ion battery cells, nickel-metal hydride battery cells, and the like. Hereinafter, the present description assumes an example that uses lithium-ion battery cells (nominal voltage: 3.6-3.7 V). Management unit 42 monitors the voltage, temperature, current, SOC (State of Charge), and SOH (State of Health) of the plurality of cells contained in battery pack 41 and transmits the data to vehicle controller 30 via an in-vehicle network. For the in-vehicle network, it is possible to use, for example, CAN (Controller Area Network) or LIN (Local Interconnect Network).

Inverter 35 is a drive circuit for driving motor 34, and it converts direct-current power supplied from battery pack 41 into alternating-current power and supplies the alternating-current power to motor 34 during motoring operation. During regeneration, inverter 35 converts alternating-current power supplied from motor 34 into direct-current power and supplies the direct-current power to battery pack 41. During motoring operation, motor 34 rotates in response to the alternating-current power supplied from inverter 35. During regeneration, motor 34 converts rotational energy produced by deceleration into alternating-current power and supplies it to inverter 35.

Figure 2:
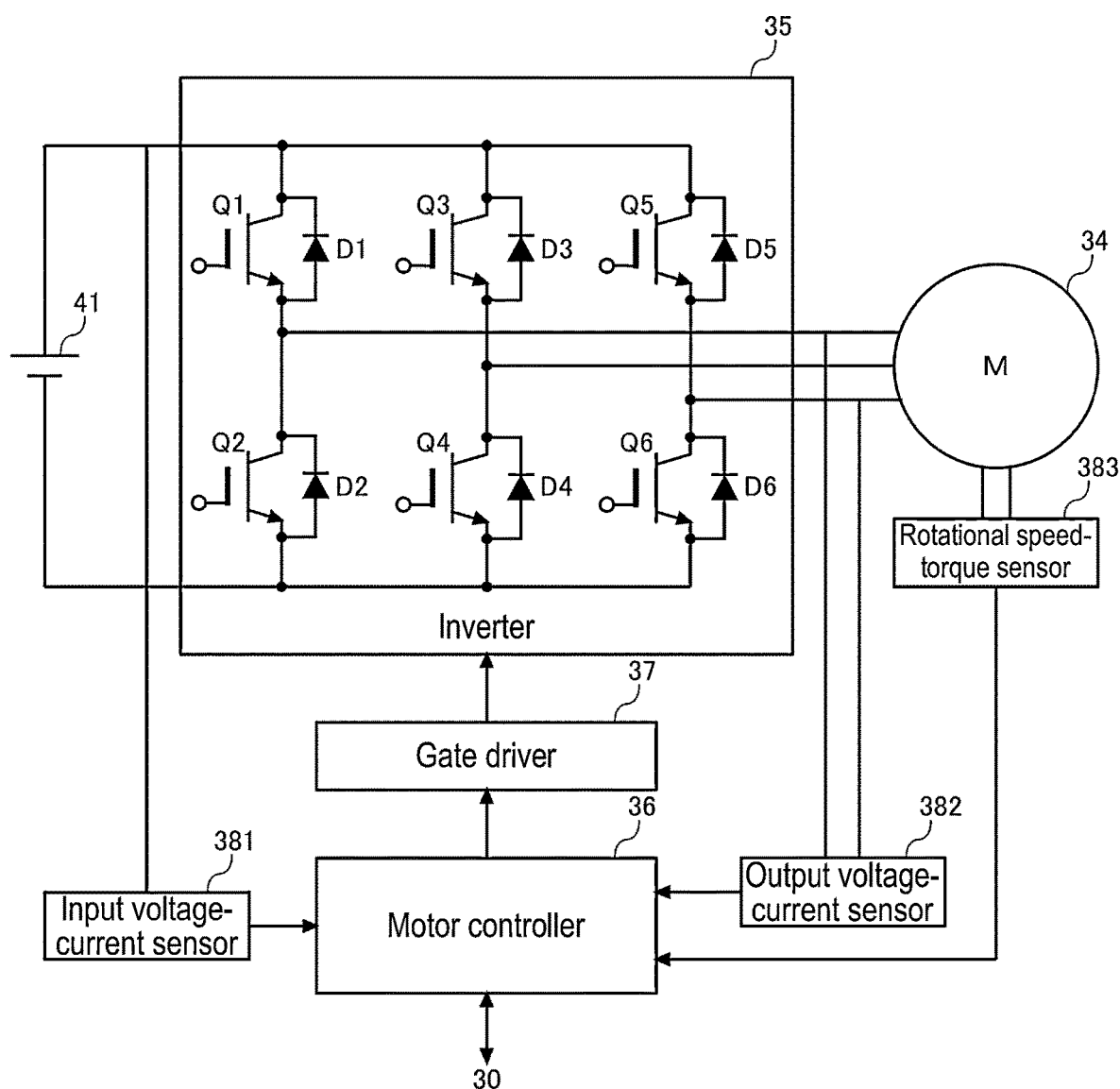
FIG. 2 is a view illustrating the schematic configuration of a drive system of the electrically-powered vehicle.

FIG. 2 is a view illustrating the schematic configuration of a drive system of electrically-powered vehicle 3. FIG. 2 illustrates an example in which a three-phase AC motor is used for motor 34 for driving electrically-powered vehicle 3 and three-phase AC motor 34 is driven by three-phase inverter 35. Three-phase inverter 35 converts the direct-current power supplied from battery pack 41 into three-phase alternating-current power, each phase of which is shifted by 120 degrees, to drive three-phase AC motor 34.

Inverter 35 includes a first arm in which first switching element Q1 and second switching element Q2 are connected in series, a second arm in which third switching element Q3 and fourth switching element Q4 are connected in series, and a third arm in which fifth switching element Q5 and sixth switching element Q6 are connected in series. The first-third arms are connected in parallel to battery pack 41.

In FIG. 2, IGBTs are used for first switching element Q1-sixth switching element Q6. First diode D1-sixth diode D6 are connected in inversely parallel to first switching element Q1-sixth switching element Q6, respectively. Note that when MOSFETs are used for first switching element Q1-sixth switching element Q6, parasitic diodes formed in a direction from source to drain are used as first diode D1-sixth diode D6.

Motor controller 36 acquires the input DC voltage and the input DC current of inverter 35 that are detected by input voltage-current sensor 381, the output AC voltage and the output AC current of inverter 35 that are detected by output voltage-current sensor 382, and the rotational speed and the rotational torque of three-phase AC motor 34 that are detected by rotational speed-torque sensor 383. Motor controller 36 also acquires acceleration signals or brake signals that are produced in response to driver's operations or generated by an automated driving controller.

Based on these input parameters, motor controller 36 generates PWM signals for driving inverter 35 and outputs the signals to gate driver 37. Gate driver 37 generates drive signals for first switching element Q1-sixth switching element Q6 based on the PWM signals that are input from motor controller 36 and a predetermined carrier wave, and inputs the drive signals to the gate terminals of first switching element Q1-sixth switching element Q6.

Motor controller 36 transmits the input DC voltage of inverter 35, the input DC current of inverter 35, the rotational speed of motor 34, and the rotational torque of motor 34 to vehicle controller 30 via the in-vehicle network.

Now refer back to FIG. 1. Vehicle controller 30 is a vehicle ECU (Electronic Control Unit) for controlling the entirety of electrically-powered vehicle 3 and may be composed of an integrated-type VCM (Vehicle Control Module), for example.

Vehicle speed sensor 385 generates a pulse signal proportional to the rotational speed of front wheel axle 32$f$ or rear wheel axle 32$r$ and transmits the generated pulse signal to vehicle controller 30. Vehicle controller 30 detects the speed of electrically-powered vehicle 3 based on the pulse signal received from vehicle speed sensor 385.

Wireless communicator 39 performs signal processing for wirelessly connecting to a network via antenna 39$a$. For the wireless communication network to which electrically-powered vehicle 3 can be wirelessly connected, it is possible to use a mobile telephone network (cellular network), wireless LAN, V2I (Vehicle-to-Infrastructure), V2V (Vehicle-to-Vehicle), ETC system (Electronic Toll Collection System), and DSRC (Dedicated Short Range Communications), for example.

While electrically-powered vehicle 3 is driving, vehicle controller 30 is able to transmit driving data in real time to a cloud server for accumulating data or an on-premise server using wireless communicator 39. The driving data include the vehicle speed of electrically-powered vehicle 3, the voltage, temperature, SOC, and SOH of the plurality of cells contained in battery pack 41, the input DC voltage and the input DC current of inverter 35, and the rotational speed and the rotational torque of motor 34. Vehicle controller 30 samples these data periodically (for example, every 10 seconds) and each time transmits the data to the cloud server or the on-premise server.

It is also possible that vehicle controller 30 may store the driving data of electrically-powered vehicle 3 in an internal memory and transmit the driving data accumulated in the memory at once at predetermined timing. For example, vehicle controller 30 may transmit the driving data accumulated in the memory at once to a terminal device in a sales office after the closure of the business of a day. The terminal device of the sales office transmits the driving data of a plurality of electrically-powered vehicles 3 to the cloud server or the on-premise server at predetermined timing.

It is also possible that, during charging from a charger provided with a network communication feature, vehicle controller 30 may transmit the driving data accumulated in the memory at once to the charger via a charging cable. The charger transmits the received driving data the cloud server or the on-premise server. This example is effective for electrically-powered vehicles 3 that are not equipped with a wireless communication feature.

Figure 3:
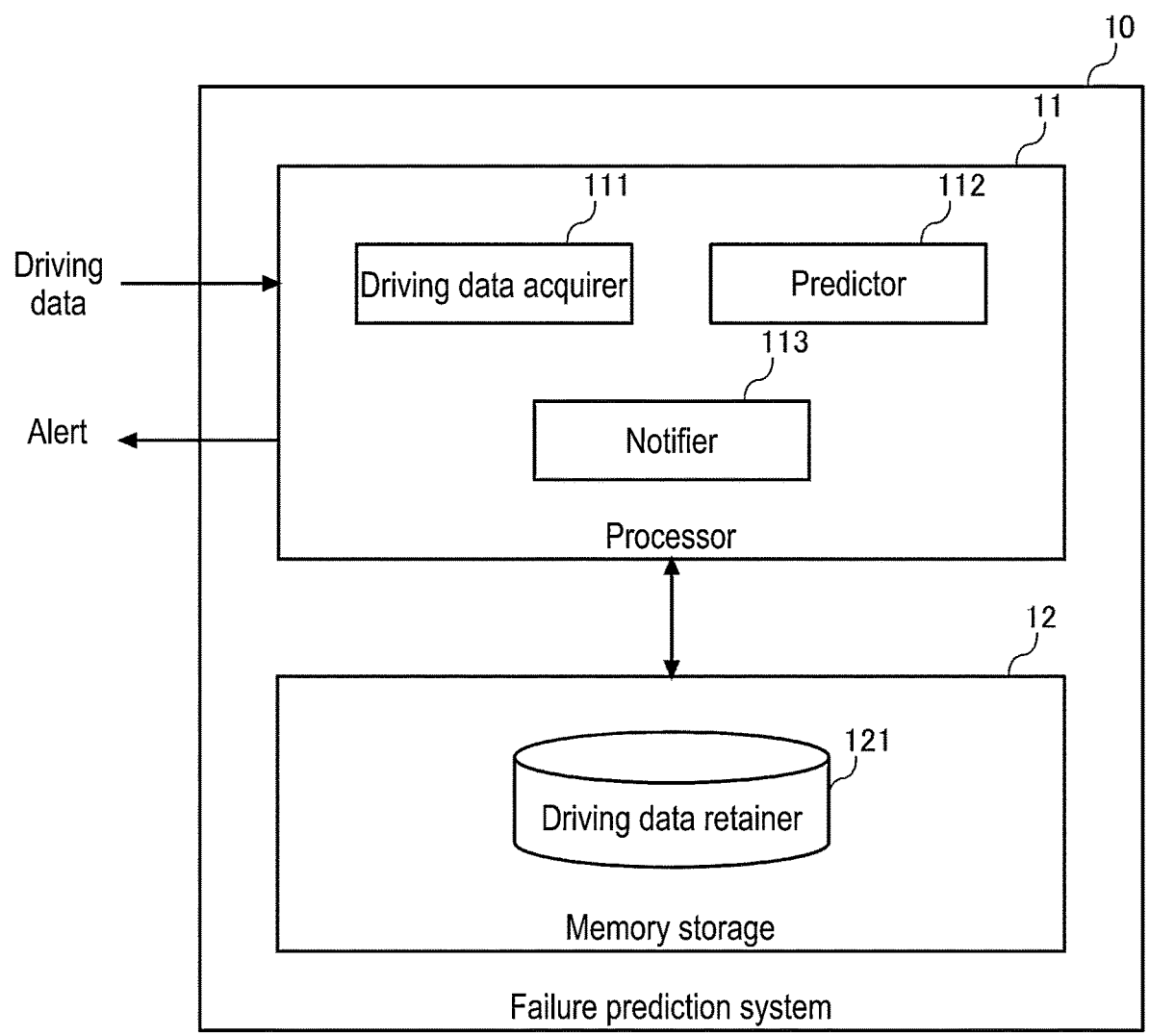
FIG. 3 is a view illustrating an example of the configuration of a failure prediction system according to an exemplary embodiment.

FIG. 3 is a view illustrating an example of the configuration of failure prediction system 10 according to an exemplary embodiment. Failure prediction system 10 is constructed of one or more servers. For example, failure prediction system 10 may be constructed of a single on-premise server that is installed in a data center or an on-premise facility. Alternatively, failure prediction system 10 may be constructed of a cloud server that is used based on a cloud service. Failure prediction system 10 may also be constructed of a plurality of on-premise servers that are distributed at a plurality of locations (data centers or on-premise facilities). Failure prediction system 10 may also be constructed of a combination of a cloud server that is used based on a cloud service and an on-premise server. Failure prediction system 10 may also be constructed of a plurality of cloud servers based on the contracts with a plurality of cloud service providers.

Failure prediction system 10 includes processor 11 and memory storage 12. Processor 11 includes driving data acquirer 111, predictor 112, and notifier 113. The functions of processor 11 can be implemented by either combinations of hardware resources and software resources or hardware resources alone. For the hardware resources, it is possible to use CPU, ROM, RAM, GPU (Graphics Processing Unit), ASIC (Application Specific Integrated Circuit), FPGA (Field Programmable Gate Array), and other LSIs. For the software resources, it is possible to use programs such as operating systems and application software programs.

Memory storage 12 includes driving data retainer 121. Memory storage 12 includes a non-volatile memory storage medium, such as HDD (Hard Disk Drive) and SSD (Solid State Drive), to store various types of data.

Driving data acquirer 111 acquires driving data of electrically-powered vehicle 3 via a network and stores the acquired driving data into driving data retainer 121. Predictor 112 reads driving data of subject electrically-powered vehicle 3 for a given time period (for example, for one month) which are stored in driving data retainer 121 and predicts an aging failure of inverter 35 and motor 34 (hereinafter both are collectively referred to as an electromechanical transducer) of that electrically-powered vehicle 3. Hereinafter, specific details will be described.

Predictor 112 calculates input electric power EP [W] of inverter 35 at each sample time, based on input DC voltage V [V] and input DC current I [A] of inverter 35 at each sample time, which are contained in the read driving data (see (Eq. 1)).

$$EP = V \times I \tag{Eq. 1}$$

Predictor 112 calculates shaft output power MP [W] of motor 34 at each sample time, based on rotational speed N [rpm] and rotational torque T [N·m] of motor 34 at each sample time, which are contained in the read driving data (see (Eq. 2)).

$$MP = 2\pi \times N \times T/60 \tag{Eq. 2}$$

Predictor 112 performs regression analysis of a plurality of data representing the corresponding relationship between input electric power EP of inverter 35 and shaft output power MP of motor 34 based on the driving data within a given time period, to generate a regression line. For the linear regression, it is possible to use, for example, a least squares method. Because the difference between input electric power EP of inverter 35 and shaft output power MP of motor 34 represents the total of loss of inverter 35 and loss of motor 34, each of the data represents the instantaneous value of loss of the electromechanical transducer. Note that the regression analysis performed by predictor 112 is not limited to simple linear regression analysis of linear regression but may be multiple regression analysis.

Figure 4:
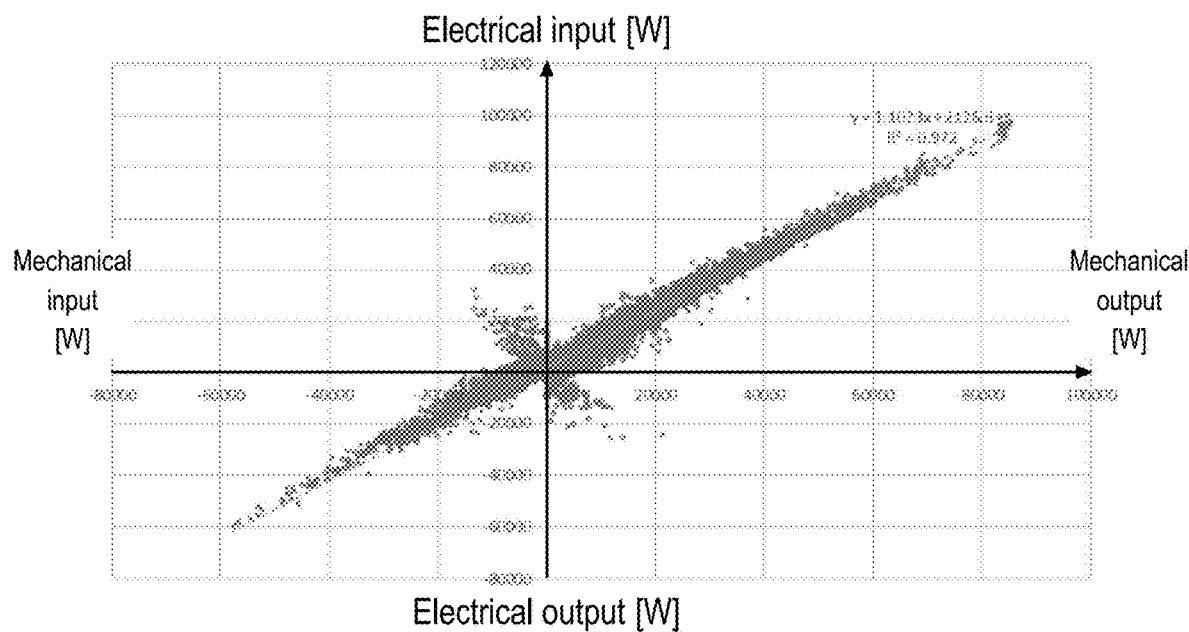
FIG. 4 is a graph illustrating an example in which a plurality of data representing losses of an electromechanical transducer of a given electrically-powered vehicle in a target period are plotted and subjected to linear regression.
Figure 5:
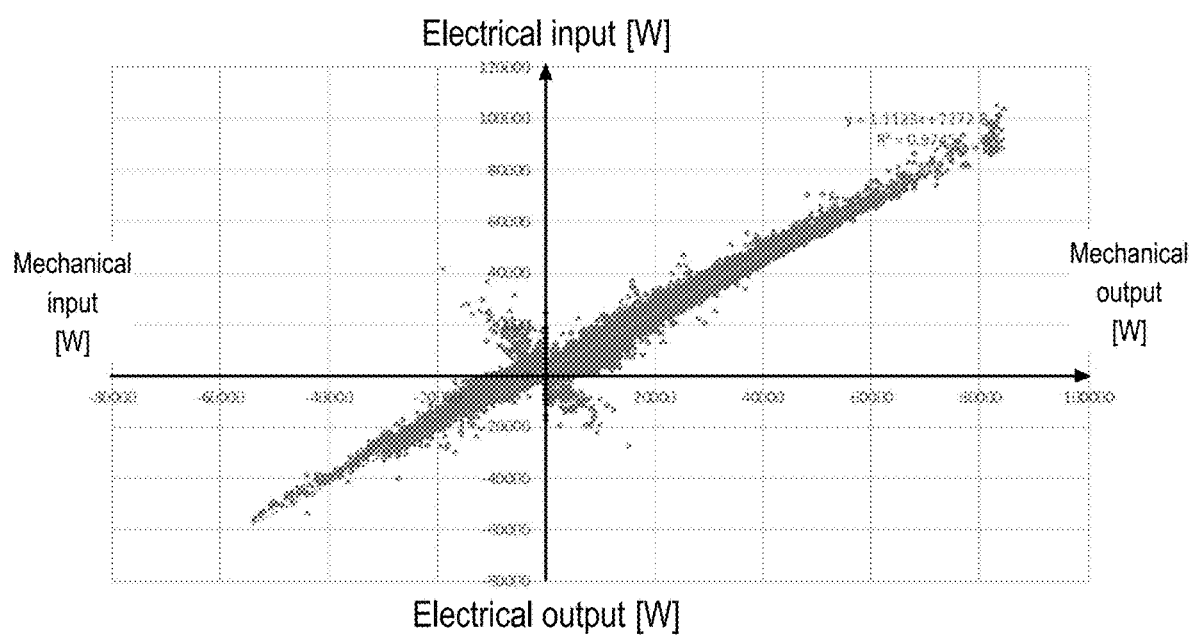
FIG. 5 is a graph illustrating an example in which a plurality of data representing losses of the electromechanical transducer of the same electrically-powered vehicle in a reference period are plotted and subjected to linear regression.

FIG. 4 is a graph illustrating an example in which a plurality of data representing losses of an electromechanical transducer of given electrically-powered vehicle 3 in a target period are plotted and subjected to linear regression. FIG. 5 is a graph illustrating an example in which a plurality of data representing losses of the electromechanical transducer of the same electrically-powered vehicle 3 in a reference period are plotted and subjected to linear regression. The target period is a given one month period, and the reference period is a period of the same month of the previous year.

In the graphs shown in FIGS. 4 and 5, the x-axis represents shaft output power MP of motor 34, and the y-axis represents input electric power EP of inverter 35. The first quadrant of the graphs shows the plot data when motor 34 is in motoring operation. During motoring operation, motor 34 rotates based on the electric power supplied from battery pack 41 to inverter 35. That is, the relationship is electrical input (input electric power EP is positive)→mechanical output (shaft output power MP is positive).

The third quadrant of the graphs shows the plot data when motor 34 is in regenerative operation. During regeneration, the rotational energy of motor 34 is recovered via inverter 35 into battery pack 41. That is, the relationship is mechanical input (shaft output power MP is negative)→electrical output (input electric power EP is positive).

Predictor 112 calculates each of plot data based on the input DC voltage and the input DC current of inverter 35, the rotational speed of motor 34, and the rotational torque of motor 34 that are sampled at the same time. Input electric power EP of inverter 35 varies in response to the accelerator opening of electrically-powered vehicle 3.

Strictly speaking, there is a time lag before input power EP of inverter 35 is reflected to shaft output power MP of motor 34. This produces plot data in which the change in input electric power EP of inverter 35 resulting from the change in the accelerator opening is not reflected to shaft output power MP of motor 34. The just-mentioned plot data appear in the second quadrant (electrical input-mechanical input) and the fourth quadrant (electrical output-mechanical output). However, if the number of plot data is large, the influence from the plot data appearing in the second quadrant and the fourth quadrant is insignificant.

The regression line generated from the plurality of plot data shown in FIG. 4 is expressed by the following (Eq. 3), and the regression line generated from the plurality of plot data shown in FIG. 5 is expressed by the following (Eq. 4).

$$y = 1.1023x + 2126.8 \quad \text{(Eq. 3)}$$
$$R^2 = 0.972$$
$$x = 1.1123x + 2272.8 \quad \text{(Eq. 4)}$$
$$R^2 = 0.9745$$

Both regression lines indicate that coefficient of determination $R^2$ (square of correlation coefficient R) exceeds 0.97 and that there is a very strong positive correlation between input electric power EP of inverter 35 and shaft output power MP of motor 34. Predictor 112 predicts the time of occurrence of aging failure of the electromechanical transducer based on the change in the slope of the regression line. In the examples shown in FIGS. 4 and 5, the slope of the regression line increases from 1.1023 to 1.1123 in one year. This increase indicates the increase in loss (decrease in efficiency) of the electromechanical transducer.

Figure 6:
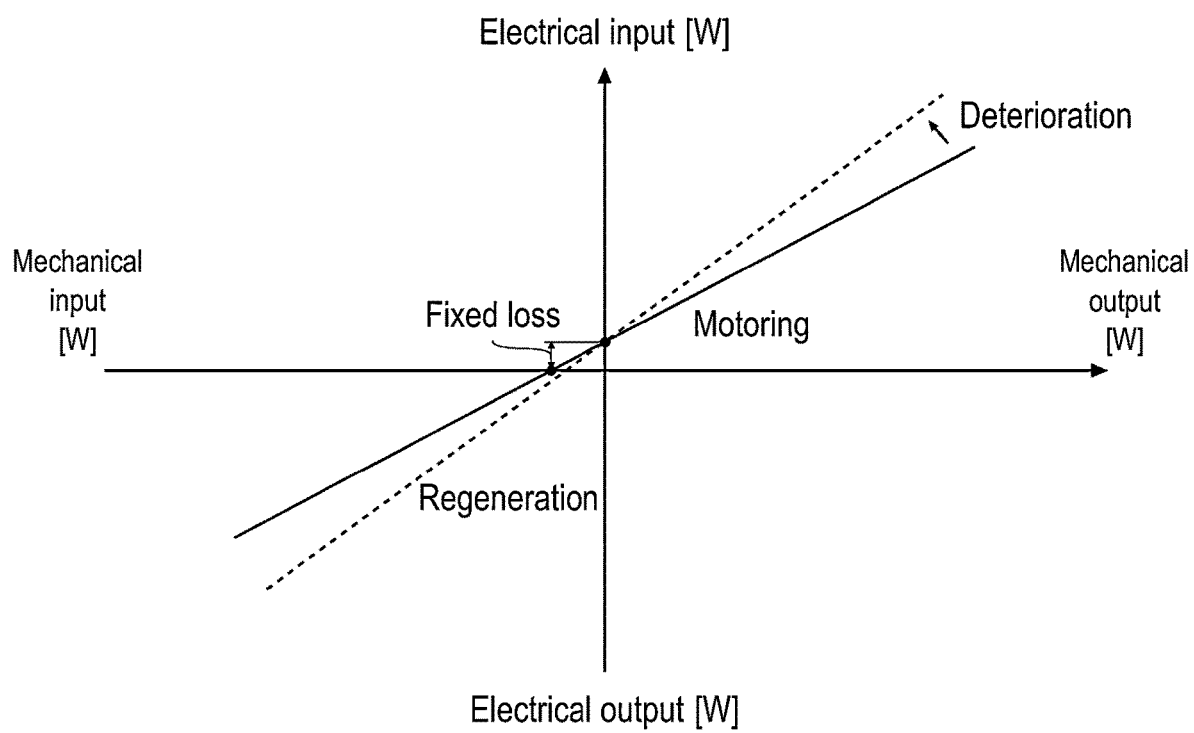
FIG. 6 is a graph schematically illustrating a change in the slope of a regression line.

FIG. 6 is a graph schematically illustrating a change in the slope of a regression line. The y-intercept of the regression line indicates input electric power EP [W] of inverter 35 when shaft output power MP of motor 34 is 0 [W]. That is, it indicates the fixed loss (offset) of the electromechanical transducer. The value of the slope indicates the conversion efficiency of the electromechanical transducer. Predictor 112 determines that the time of occurrence of aging failure of the electromechanical transducer is approaching if the slope of the regression line for a target period increases by greater than or equal to a threshold value with respect to the slope of the regression line for a reference period. Although the threshold value varies depending on the permissible losses of motor 34 and inverter 35, it may be set to a value at which the value of the slope of the regression line increases by a predetermined value (for example, 1.0%) with respect to an initial value.

Note that the graphs shown in FIGS. 4-6 illustrates examples in which the x-axis represents shaft output power MP of motor 34 and the y-axis represents input electric power EP of inverter 35. In this respect, it is possible that the x-axis may represent input electric power EP of inverter 35 and the y-axis may represent shaft output power MP of motor 34. When this is the case, the fixed loss of the electromechanical transducer appears as the x-intercept of the regression line and the conversion efficiency of the electromechanical transducer appears as the slope of the regression line. Predictor 112 determines that the time of occurrence of aging failure of the electromechanical transducer is approaching if the slope of the regression line for a target period decreases by greater than or equal to a threshold value with respect to the slope of the regression line for a reference period.

When it is determined that the time of occurrence of aging failure of the electromechanical transducer is approaching, notifier 113 transmits an alert indicating that the occurrence of failure of the electromechanical transducer is close, to electrically-powered vehicle 3 incorporating the just-mentioned electromechanical transducer or to a driving management terminal device (not shown) that manages the just-mentioned electrically-powered vehicle 3.

The user who has received the just-mentioned alert takes the subject electrically-powered vehicle 3 to the dealer or a repair garage to have a precise failure diagnosis for inverter 35 and motor 34. Based on the precise failure diagnosis, the user is allowed to have inverter 35 or motor 34 repaired or replaced, or to make a reservation for replacement after a predetermined period.

Additionally, when failure prediction system 10 is able to acquire detection values of a vibration sensor provided on a bearing or the like of motor 34, predictor 112 can estimate wearing of the bearing of motor 34 based on the detection values of the vibration sensor to estimate an increment of loss of motor 34. Predictor 112 can estimate an increment of loss of inverter 35 by subtracting the increment of loss of motor 34 from the increment of loss of the electromechanical transducer. In this case, predictor 112 can judge the time of occurrence of aging failure of inverter 35.

The conversion efficiency of motor 34 changes according to the operating point specified by rotational speed N [rpm] and rotational torque T [N·m]. The efficiency reduces when rotational speed N [rpm] is either higher or lower from the optimum rotational speed. Basically, the more the rotational speed deviates from the optimum rotational speed, the lower the efficiency. Likewise, the efficiency also reduces when rotational torque T [N·m] is either higher or lower from the optimum torque. Basically, the more the rotational torque deviates from the optimum torque, the lower the efficiency. For example, a certain motor has an operating point with maximum efficiency (94%) in the vicinity of a rotational speed N of 2300 [rpm] and a rotational torque T of 90 [N·m]. Note that the efficiency map of the motor varies from one type from another.

Figure 7A:
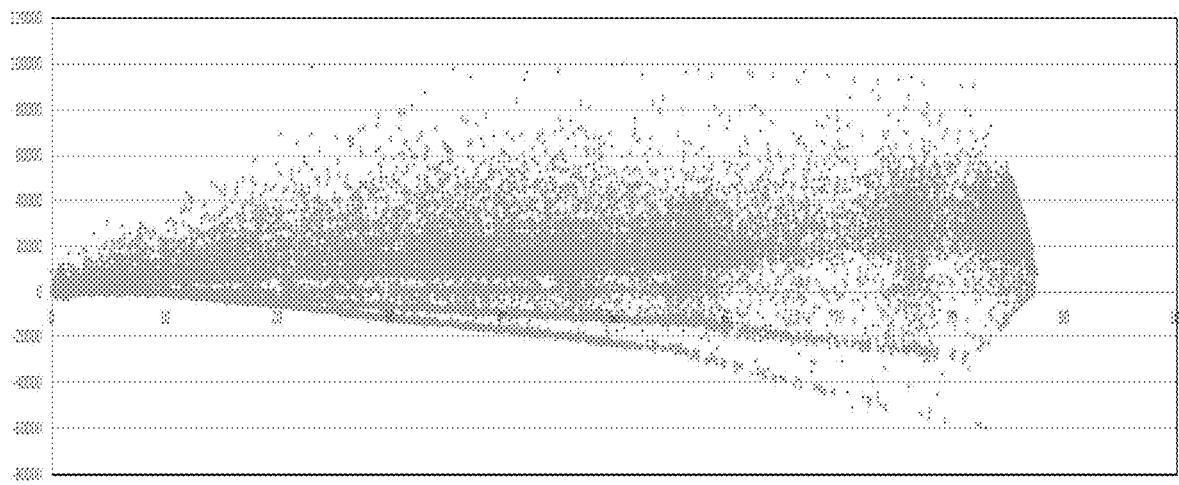
FIG. 7A is a plot of a plurality of data representing the corresponding relationship between the speed of the electrically-powered vehicle and the input electric power of an inverter, generated from driving data on which the graph shown in FIG. 5 is based.
Figure 7B:
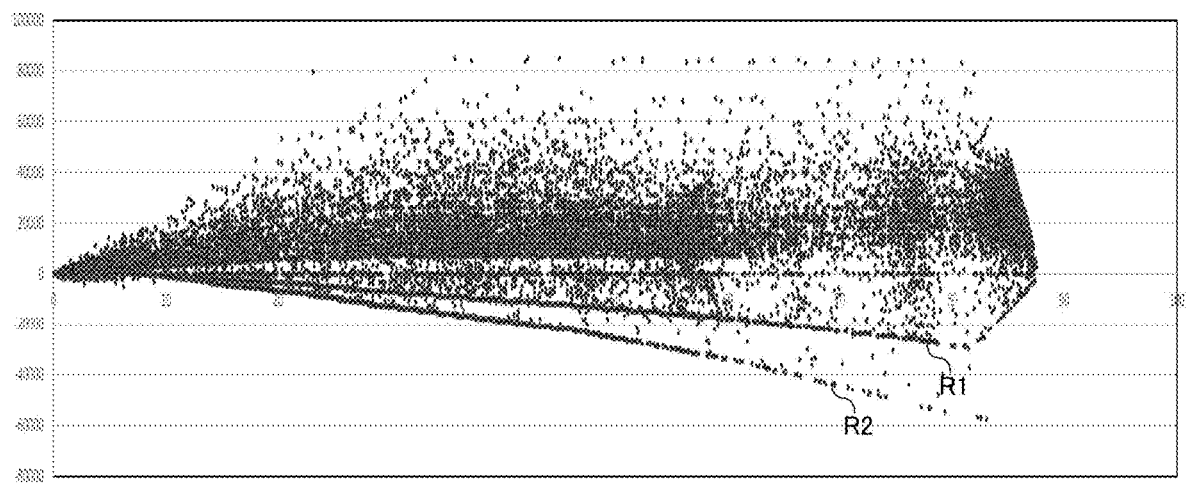
FIG. 7B is a plot of a plurality of data representing the corresponding relationship between the speed of the electrically-powered vehicle and the shaft output power of a motor, generated from driving data on which the graph shown in FIG. 5 is based.

FIG. 7A is a plot of a plurality of data representing the corresponding relationship between the speed of electrically-powered vehicle 3 and input electric power EP of inverter 35, generated from driving data on which the graph shown in FIG. 5 is based. FIG. 7B is a plot of a plurality of data representing the corresponding relationship between the speed of electrically-powered vehicle 3 and shaft output power MP of motor 34, generated from driving data on which the graph shown in FIG. 5 is based.

The data shown in FIGS. 7A-7B contain only those with the speed of electrically-powered vehicle 3 being 88 [km/h] range, which means that the speed of electrically-powered vehicle 3 is limited within 88 [km/h] range. In the graph shown in FIG. 7B, a large number of data are plotted in a region in which shaft output power MP of motor 34 is negative (regeneration region) along two lines R1, R2. This indicates that motor controller 36 of electrically-powered vehicle 3 controls at least one of rotational speed N and rotational torque T of motor 34 during regeneration so that motor 34 generates electric power at operating points with high conversion efficiency of motor 34. In the example shown in FIG. 7B, controlling is performed in two regeneration modes. First line R1 represents the data when controlling is performed in a low regeneration mode, while second line R2 represents the data when controlling is performed in a high regeneration mode.

When controlled in the low regeneration mode, the conversion efficiency of motor 34 is approximately constant. Likewise, when controlled in the high regeneration mode, the conversion efficiency of motor 34 is also approximately constant. In the regeneration region, a large number of data are plotted along two lines R1, R2. Therefore, the data in the regeneration region means that variations in the conversion efficiency of motor 34 are small.

The smaller the variations in the conversion efficiency of motor 34, the more highly accurately the loss of inverter 35 can be estimated from the loss of the electromechanical transducer. From this perspective, predictor 112 may generate the above-mentioned regression line using only the driving data in a regeneration state, in which a regeneration current flows from motor 34 toward inverter 35, among the driving data for the target period. Likewise, the regression line for the reference period may also be generated from the driving data in the regeneration state. Furthermore, predictor 112 may generate the above-mentioned regression line using only the driving data along first line R1 or only the driving data along second line R2.

In statistical processing in general, the greater the number of samples, the more highly accurately the regression analysis can be performed. From that perspective, it is desirable that predictor 112 generate the above-mentioned regression line using both the driving data in the regeneration state and the driving data in a motoring state, in which a motoring current flows from inverter 35 to motor 34, among the driving data for the target period. Particularly when the driving data in the regeneration state cannot be obtained sufficiently, it is desirable to use the driving data in both the motoring state and the regeneration state. Accordingly, when the driving data that should be used as the basic data for generating the regression line is insufficient in only one of the motoring state and the regeneration state, in other words, when it is necessary to increase the amount of driving data that should be used as the basic data for generating the regression line, it is preferable to switch predictor 112 so as to generate the regression line based on the driving data in both the motoring state and the regeneration state.

It is also preferable that predictor 112 perform weighting of the driving data when sampling the driving data that are used as the basic data for generating the regression line. For example, it is also possible to provide a difference in weighting between the motoring state and the regeneration state so that the driving data in the regeneration state are considered more important. It is also possible to exclude the plot data appearing in the second quadrant and the fourth quadrant in the graphs shown in FIGS. 4 and 5 from the driving data that should be used as the basic data.

Figure 8:
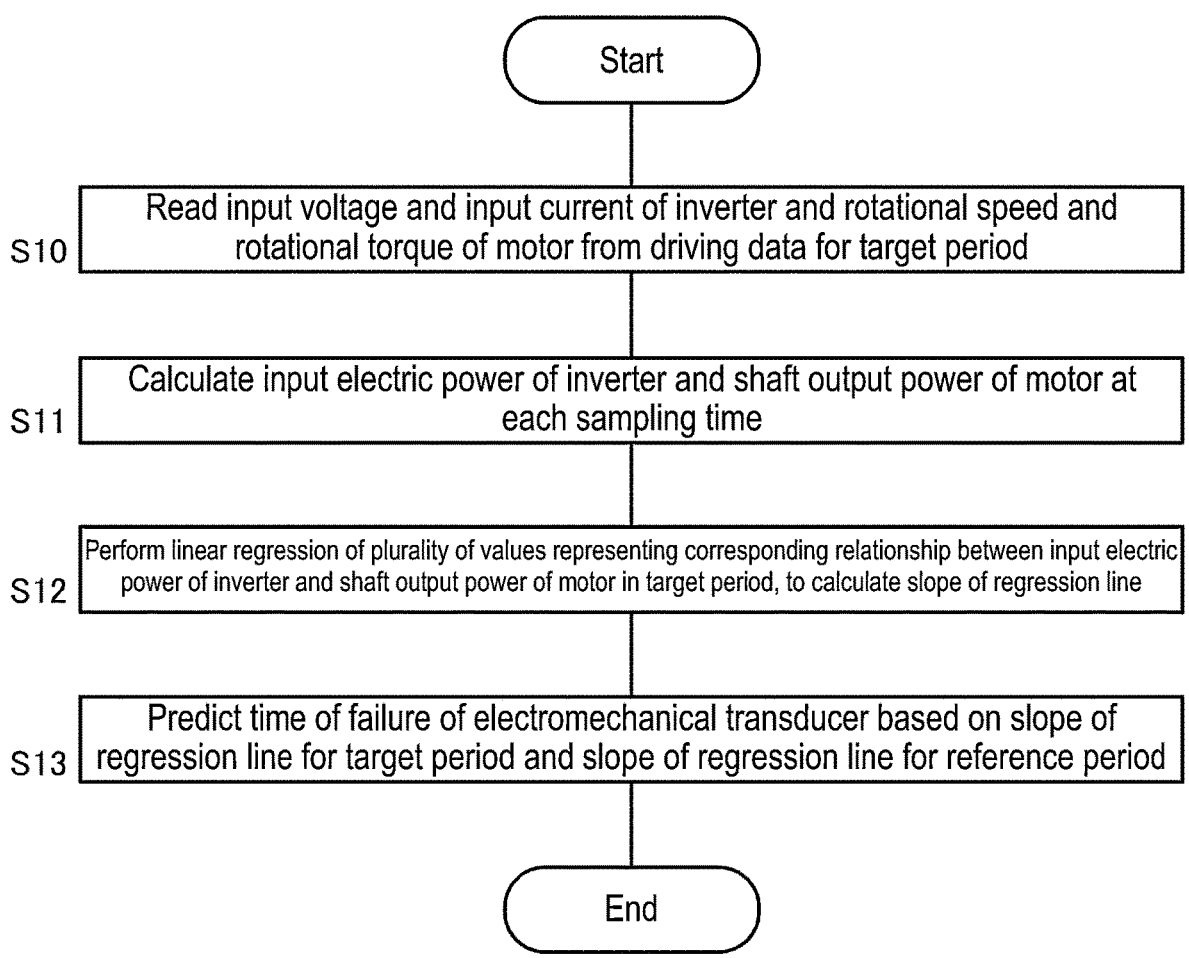
FIG. 8 is a flowchart illustrating a process flow of predicting an aging failure of an electromechanical transducer, performed by a failure prediction system according to an exemplary embodiment.

FIG. 8 is a flowchart illustrating a process flow of predicting an aging failure of an electromechanical transducer, performed by failure prediction system 10 according to an exemplary embodiment. Predictor 112 reads the input DC voltage and the input DC current of inverter 35 for a target period and the rotational speed and the rotational torque of motor 34 for the target period, which are accumulated in driving data retainer 121 (S10). Predictor 112 calculates the input electric power of inverter 35 and the shaft output power of motor 34 at each sampling time (S11). Predictor 112 performs linear regression of a plurality of values representing the corresponding relationship between the input electric power of inverter 35 and the shaft output power of motor 34 within a target period and calculates the slope of the regression line (S12).

Predictor 112 likewise calculates the slope of the regression line for a reference period. Note that when the slope of the regression line for the reference period has already been calculated and the value of the slope is stored in driving data retainer 121, predictor 112 reads and uses that stored value.

Predictor 112 predicts the time of occurrence of aging failure of the electromechanical transducer based on the slope of the regression line for the target period and the slope of the regression line for the reference period (S13). As needed, notifier 113 sends an alert to electrically-powered vehicle 3 or the driving management terminal device (not shown) that manages the subject electrically-powered vehicle 3.

As described above, the present disclosure makes it possible to predict deterioration over time of the electromechanical transducer of electrically-powered vehicle 3 at low cost. If the driving data of electrically-powered vehicle 3 are acquired and stored, electrically-powered vehicle 3 need not be provided with additional components (for example, sensors for detecting failures of switching elements Q1-Q6). By the analysis of log data alone, failures of the electromechanical transducer can be predicted with high accuracy and at low cost.

Since the voltage and current of three-phase sine wave alternating current between inverter 35 and motor 34, it is unnecessary to save log data for high speed sampling. The input voltage and the input current of inverter 35 are direct current, and the changes in accelerator opening is not high speed changes on the order of microseconds or milliseconds. Likewise, the changes in the rotational speed and the rotational torque of motor 34 are not high speed changes on the order of microseconds or microseconds either. Therefore, for the input voltage and the input current of inverter 35 and the rotational speed and the rotational torque of motor 34, the necessity to store log data that are sampled at high speed is low, but it is sufficient to store log data that are sampled at low speed on the order of seconds.

Thus, the present exemplary embodiment requires neither high-specification memories nor additional sensors, necessitating essentially zero additional hardware cost. Prediction is possible from the existing accumulated data in the cloud alone. Moreover, because the focus is on the relationship between the input electric power of inverter 35 and the shaft output power of motor 34 at the same time, it is possible to eliminate dependence on external factors, such as driving paths and driving environments.

Thus, according to the present exemplary embodiment, the time of failure of the electromechanical transducer is predicted from the estimate of increase in the loss of the electromechanical transducer over time, whereby the user can be notified of the time of failure in advance, to prompt the user to replace or repair inverter 35 or motor 34. This enables the user to avoid the inconvenience of sudden failure of inverter 35 or motor 34, which causes the vehicle to be unable to operate. The user is allowed to replace inverter 35 or motor 34 at optimum timing as preventive maintenance. This enables the user to minimize downtime while pursuing economic advantage.

When the deterioration of motor 34 can be estimated from an existing vibration sensor or the like, predictor 112 is able to predict the time of failure of inverter 35. If using the driving data with the efficiency of the motor 34 being as close as possible (for example, the driving data during regeneration only), predictor 112 may be able to estimate the loss of inverter 35 with higher accuracy.

Hereinabove, the present disclosure has been described with reference to exemplary embodiments. It should be understood that these exemplary embodiments are merely illustrative examples. A person skilled in the art will understand that various changes and modifications of elements and combinations of processes are possible herein, and such changes and modifications are also within the scope of the present disclosure.

The above-described failure prediction system 10 may be mounted in battery controller 32 within electrically-powered vehicle 3. Although a high capacity memory is required in this case, data loss may be lessened.

In addition, the foregoing exemplary embodiment assumes a four-wheeled electric vehicle as electrically-powered vehicle 3. In this respect, electrically-powered vehicle 3 may also be an electric motorcycle (electric scooter), an electric bicycle, or an electric kick scooter. Moreover, electric vehicles include not only fully electric vehicles but also low speed electric vehicles, such as golf carts and light utility vehicles used in shopping malls or entertainment facilities. Furthermore, the objects to which battery pack 41 is to be mounted are not limited to electrically-powered vehicles 3. For example, other electrically-powered moving bodies, such as electric watercrafts, railway cars, and multicopters (drones), may also be included.

It should be noted that the exemplary embodiments may be specified by the following items.

[Item 1] A failure prediction system (10) includes: an acquirer (111) acquiring driving data of an electrically-powered moving body (3); and
 a predictor (112) predicting, based on the driving data of the electrically-powered moving body (3), an aging failure of an electromechanical transducer (34, 35) including a motor (34) driving a driving wheel (31R) of the electrically-powered moving body (3) and a drive circuit (35) driving the motor (34), wherein:
 the driving data include an input voltage of the drive circuit (35), an input current of the drive circuit (35), a rotational speed of the motor (34) driven by the drive circuit (35), and a rotational torque of the motor (34); and
 the predictor (112) predicts the aging failure of the electromechanical transducer (34, 35) based on a change of a value statistically representing a relationship between an input electric power of the drive circuit (35) and a shaft output power of the motor (34), the input electric power of the drive circuit (35) obtained based on the input voltage and the input current of the drive circuit (35), and the shaft output power of the motor (34) obtained based on the rotational speed and the rotational torque of the motor (34).

This makes it possible to predict deterioration over time of the electromechanical transducer (34, 35) of the electrically-powered moving body (3) at low cost.

[Item 2] The failure prediction system (10) according to item 1, wherein the predictor (112) predicts the aging failure of the electromechanical transducer (34, 35) based on a change of a slope of a regression line obtained by linear regression of a plurality of data representing a corresponding relationship between the input electric power of the drive circuit (35) and the shaft output power of the motor (34) based on the driving data within a given time period.

This makes it possible to predict a change over time of the loss of the electromechanical transducer (34, 35) with high accuracy.

[Item 3] The failure prediction system (10) according to item 2, wherein the predictor (112) extracts, from the driving data within the given time period, driving data in a state in which a regeneration current flows from the motor (34) to the drive circuit (35), to generate the regression line.

This makes it possible to estimate the loss of the electromechanical transducer (34, 35) based on the data in which variations in the conversion efficiency of motor (34) are small.

[Item 4] The failure prediction system (10) according to item 2, wherein the predictor (112) generates the regression line based on, of the driving data within the given time period, driving data both in a state in which a motoring current flows from the drive circuit (35) to the motor (34) and in a state in which a regeneration current flows from the motor (34) to the drive circuit (35).

This makes it possible to obtain a sufficient number of sample data for estimating the loss of the electromechanical transducer (34, 35).

[Item 5] The failure prediction system (10) according to item 2, wherein:
 the predictor (112) generates the regression line based on, of the driving data within the given time period, driving data either in a state in which a motoring current flows from the drive circuit (35) to the motor (34) or in a state in which a regeneration current flows from the motor (34) to the drive circuit (35); and
 when the predictor (112) increases driving data to be used as basic data for generating the regression line, the predictor (112) generates the regression line based on driving data both in the state in which the motoring current flows from the drive circuit (35) to the motor (34) and in the state in which the regeneration current flows from the motor (34) to the drive circuit (35).

This prevents lowering of prediction accuracy resulting from insufficiency in the number of required data.

[Item 6] The failure prediction system (10) according to any one of items 1 through 5, wherein:
 driving data of a plurality of the electrically-powered moving bodies (3) are accumulated in a server (12); and
 the predictor (112) predicts the aging failure of the electromechanical transducer (34, 35) based on the driving data accumulated in the server (12).

This makes it possible to implement a cloud service that provides prediction of an aging failure of the electromechanical transducer (34, 35) based on the driving data accumulated in the server (12).

[Item 7] A failure prediction method (10) including:
 a step of acquiring driving data of an electrically-powered moving body (3); and
 a step of predicting, based on the driving data of the electrically-powered moving body (3), an aging failure of an electromechanical transducer (34, 35) including a motor (34) driving a driving wheel (31R) of the electrically-powered moving body (3) and a drive circuit (35) driving the motor (34), wherein:
 the driving data include an input voltage of the drive circuit (35), an input current of the drive circuit (35), a rotational speed of the motor (34) driven by the drive circuit (35), and a rotational torque of the motor (34); and
 the step of predicting predicts the aging failure of the electromechanical transducer (34, 35) based on a change of a value statistically representing a relationship between an input electric power of the drive circuit (35) and a shaft output power of the motor (34), the input electric power of the drive circuit (35) obtained based on the input voltage and the input current of the drive circuit (35), and the shaft output power of the motor (34) obtained based on the rotational speed and the rotational torque of the motor (34).

This makes it possible to predict deterioration over time of the electromechanical transducer (34, 35) of the electrically-powered moving body (3) at low cost.

[Item 8] A failure prediction program causing a computer to execute:
- a process of acquiring driving data of an electrically-powered moving body (3); and
- a process of predicting, based on the driving data of the electrically-powered moving body (3), an aging failure of an electromechanical transducer (34, 35) including a motor (34) driving a driving wheel (31R) of the electrically-powered moving body (3) and a drive circuit (35) driving the motor (34), wherein:
  the driving data include an input voltage of the drive circuit (35), an input current of the drive circuit (35), a rotational speed of the motor (34) driven by the drive circuit (35), and a rotational torque of the motor (34); and
  the process of predicting predicts the aging failure of the electromechanical transducer (34, 35) based on a change of a value statistically representing a relationship between an input electric power of the drive circuit (35) and a shaft output power of the motor (34), the input electric power of the drive circuit (35) obtained based on the input voltage and the input current of the drive circuit (35), and the shaft output power of the motor (34) obtained based on the rotational speed and the rotational torque of the motor (34).

This makes it possible to predict deterioration over time of the electromechanical transducer (34, 35) of the electrically-powered moving body (3) at low cost.

REFERENCE MARKS IN THE DRAWINGS 3 electrically-powered vehicle, 10 failure prediction system, 11 processor, 111 driving data acquirer, 112 predictor, 113 notifier, 12 memory storage, 121 driving data retainer, 30 vehicle controller, 31*f* front wheel, 31*r* rear wheel, 32*f* front wheel axle, 32*r* rear wheel axle, 33 transmission, 34 motor, 35 inverter, 36 motor controller, 37 gate driver, 381 input voltage-current sensor, 382 output voltage-current sensor, 383 rotational speed-torque sensor, 385 vehicle speed sensor, 39 wireless communicator, 39*a* antenna, 40 power supply system, 41 battery pack, 42 management unit, Q1, Q6 switching element, D1, D6 diode.

The invention claimed is:

1. A failure prediction system comprising:
  acquirer acquiring driving data items of an electrically-powered moving body; and
  a predictor predicting, based on the driving data items of the electrically-powered moving body, an aging failure of an electromechanical transducer including a motor driving a driving wheel of the electrically-powered moving body and a drive circuit driving the motor, wherein
  the driving data items each include an input voltage of the drive circuit, an input current of the drive circuit, a rotational speed of the motor driven by the drive circuit, and a rotational torque of the motor, and
  the predictor predicts the aging failure of the electromechanical transducer based on a change of a value statistically representing a relationship between an input electric power of the drive circuit and a shaft output power of the motor, the input electric power of the drive circuit being obtained based on the input voltage and the input current of the drive circuit, and the shaft output power of the motor being obtained based on the rotational speed and the rotational torque of the motor.

2. The failure prediction system according to claim 1, wherein the predictor predicts the aging failure of the electromechanical transducer based on a change of a slope of a regression line obtained by linear regression of a plurality of data items each representing a corresponding relationship between the input electric power of the drive circuit and the shaft output power of the motor based on the driving data items within a given time period.

3. The failure prediction system according to claim 2, wherein the predictor extracts, from the driving data items within the given time period, driving data items in a state in which a regeneration current flows from the motor to the drive circuit, to generate the regression line.

4. The failure prediction system according to claim 2, wherein the predictor generates the regression line based on, of the driving data items within the given time period, driving data items both in a state in which a motoring current flows from the drive circuit to the motor and in a state in which a regeneration current flows from the motor to the drive circuit.

5. The failure prediction system according to claim 2, wherein:
  the predictor generates the regression line based on, of the driving data items within the given time period, driving data items either in a state in which a motoring current flows from the drive circuit to the motor or in a state in which a regeneration current flows from the motor to the drive circuit; and
  when the predictor increases driving data items to be used as basic data items for generating the regression line, the predictor generates the regression line based on driving data items both in the state in which the motoring current flows from the drive circuit to the motor and in the state in which the regeneration current flows from the motor to the drive circuit.

6. The failure prediction system according to claim 1, wherein:
  driving data items of a plurality of the electrically-powered moving bodies are accumulated in a server; and
  the predictor predicts the aging failure of the electromechanical transducer based on the driving data items accumulated in the server.

7. A failure prediction method comprising:
  acquiring driving data items of an electrically-powered moving body; and
  predicting, based on the driving data items of the electrically-powered moving body, an aging failure of an electromechanical transducer including a motor driving a driving wheel of the electrically-powered moving body and a drive circuit driving the motor, wherein:
  the driving data items each include an input voltage of the drive circuit, an input current of the drive circuit, a rotational speed of the motor driven by the drive circuit, and a rotational torque of the motor; and
  during predicting the aging failure of the electromechanical transducer, predicting the aging failure of the electromechanical transducer based on a change of a value statistically representing a relationship between an input electric power of the drive circuit and a shaft output power of the motor, the input electric power of the drive circuit obtained based on the input voltage and the input current of the drive circuit and the shaft output power of the motor obtained based on the rotational speed and the rotational torque of the motor.

8. A non-transitory machine-readable recording medium that stores a failure prediction program causing a computer to execute:
- a process of acquiring driving data items of an electrically-powered moving body; and
- a process of predicting, based on the driving data items of the electrically-powered moving body, an aging failure of an electromechanical transducer including a motor driving a driving wheel of the electrically-powered moving body and a drive circuit driving the motor, wherein:
- the driving data items each include an input voltage of the drive circuit, an input current of the drive circuit, a rotational speed of the motor driven by the drive circuit, and a rotational torque of the motor, and
- during the process of predicting, predicting the aging failure of the electromechanical transducer based on a change of a value statistically representing a relationship between an input electric power of the drive circuit and a shaft output power of the motor, the input electric power of the drive circuit obtained based on the input voltage and the input current of the drive circuit and the shaft output power of the motor obtained based on the rotational speed and the rotational torque of the motor.

* * * * *